United States Patent [19]
Cochran

[11] Patent Number: 5,160,539
[45] Date of Patent: Nov. 3, 1992

[54] METHOD AND PRODUCT OF FLY ASH BENEFICATION BY CARBON BURNOUT IN A DRY BUBBLING FLUID BED

[75] Inventor: Joseph W. Cochran, Clearwater, Fla.

[73] Assignee: Progress Materials Inc., St. Petersburg, Fla.

[21] Appl. No.: 680,900

[22] Filed: Apr. 5, 1991

[51] Int. Cl.$^5$ .................... C04B 18/06; C04B 14/36; C04B 20/04
[52] U.S. Cl. .................... 106/405; 106/478; 106/DIG. 1
[58] Field of Search .......... 106/405, DIG. 1, 478, 106/705; 502/39, 44

[56] References Cited

U.S. PATENT DOCUMENTS

| | | | |
|---|---|---|---|
| 3,328,180 | 6/1967 | Ban | 106/DIG. 1 |
| 3,979,168 | 9/1976 | Chalivin | 106/DIG. 1 |
| 4,043,831 | 8/1977 | Friedman | 106/DIG. 1 X |
| 4,121,945 | 10/1978 | Hurst | 106/405 |
| 4,304,659 | 12/1981 | Pratt et al. | 502/42 X |
| 4,325,833 | 4/1982 | Scott | 502/42 |
| 4,341,623 | 7/1982 | Bertolacini et al. | 502/42 X |
| 4,705,409 | 11/1987 | Trerice | 106/DIG. 1 X |
| 4,959,334 | 9/1990 | Mauleon et al. | 502/39 X |

FOREIGN PATENT DOCUMENTS 0734162 5/1980 U.S.S.R.

Primary Examiner—William R. Dixon, Jr.
Assistant Examiner—Lisa M. Schull
Attorney, Agent, or Firm—Cushman Darby & Cushman

[57] ABSTRACT

This invention relates to an apparatus, method and product wherein fine particles of fly ash containing carbon are oxidized in a dry, bubbling fluid bed of previously introduced fine particles of the same fly ash so that the subsequently removed particles have reduced carbon content and are useful as pozzolan, suitable for use, without further processing, to replace a portion of the cement in concrete. The preferred conditions are a temperature of about 1300° to 1800° F., air velocity of between at least about 0.5, but not more than about 3 ft./sec., residence time of at least about 2 minutes but up to 100 minutes, volume ratio of air to fly ash of between about 1,000 and 1500, and an excess of oxygen between about 5% and 15%.

10 Claims, 2 Drawing Sheets

METHOD AND PRODUCT OF FLY ASH BENEFICATION BY CARBON BURNOUT IN A DRY BUBBLING FLUID BED

This invention relates to a method and apparatus for producing enhanced pozzolan by fly ash benefication by burning carbon from fine particles of fly ash in a dry bubbling fluid bed of those same particles and for recovering the otherwise wasted energy associated with this carbon.

BACKGROUND OF THE INVENTION

A description of fly ash, its source and previous disposition is given in column 1 of U.S. Pat. No. 3,328,180, hereby incorporated by reference.

Various uses for fly ash are well-known in the construction (and particularly concrete) industry. Uses include production of aggregates (by various processes) for use in concrete products, raw feed to cement production processes, and direct replacement of a portion of the cement used in concrete products. This invention addresses the partial direct replacement of cement.

Various fly ash properties are known to limit its usefulness to replace cement. Chief among these are high carbon content and large particle size. Other undesirable properties include excess magnetic iron compounds, excess cenospheres, and low pozzolanity. Known processes have been applied to improve some of these characteristics with various economic results. For example, particle size may be reduced by pulverization, sieving or classification. Likewise, excess magnetic iron may be removed by magnetic separation and excess cenospheres by flotation. Although low pozzolanity may be improved by these methods, it is sometimes associated with peculiarities in the fly ash chemistry and not subject to improvement by known processes.

This invention deals with reduction of carbon in the fly ash. This has been accomplished in the past by several methods. However, the coal-fired furnace modifications, classification by particle size, and electrostatic separation methods as well as the wet flotation method in U.S. Pat. No. 4,121,945 accomplish carbon reduction by processes clearly different from those of this invention. Only this invention and the processes taught in U.S. Pat. No. 3,979,168, a report from Vliegasunie B. V. (Dutch Fly Ash Corporation, undated report, page 6, paragraph 3.3, published in the mid 1980's) and U.S. Pat. No. 4,705,409 reduce ash carbon content by oxidizing the carbon.

Burning of carbon is known. However, when the carbon is highly diluted by inert compounds and is not accompanied by volatile compounds as in fly ash the combustion becomes very difficult. The critical factors in obtaining such combustion are residence time, reaction temperature, and oxygen availability. Minimum ignition temperature and oxygen requirements are relatively well understood. A proper combination of operating conditions for dry fluid bed oxidation and particularly minimum residence time were previously unknown for carbon in fly ash.

In early work, two types of transport reactors were tested with residence times on the order of 1 to 15 seconds. By transport reactor, is meant a reactor in which all of the reactants travel together at more or less the same speed. In this early work, the large volume of air necessary to provide sufficient oxygen for carbon burnout was used to transport the reacting fly ash from inlet to discharge points. No substantial carbon burnout was detected.

Fluid bed reactors are well-known for, among other things, their ability to provide extended residence time for certain reactions Fluid beds are loosely divided into bubbling bed and circulating bed types. In the bubbling bed, the solid material stays substantially in place in the bed while the gaseous (or sometimes liquid) material travels upward through it In the circulating bed type, velocity of the fluid is greatly increased so that the bed becomes very dilute and most or all of the solid material is repeatedly ejected from the bed, separated from the fluid and reinjected into the bed.

Circulating fluid beds are known to be undesirable for very fine solids (such as fly ash) due to the economic difficulty of repeatedly separating fine solids from the fluid stream.

This invention has overcome the problems of prior art processing methods by discovering how to economically use a dry bubbling fluid bed reactor. By "dry" is meant the fluid bed is substantially free of any liquid.

It had been observed in the fluid catalyst bed art that dense beds of powder could be maintained at much higher gas velocities than the calculated settling velocity of individual particles. F. A. Zenz notes this in the Handbook of Powder Science and Technology (edited by M. E. Fayed and L. Otter) Chpt. 10, p. 464 (1984 Van Nostrand Reinhold Co.). It was not known, however, whether a dry bubbling bed reactor, using fly ash particles instead of catalyst particles, could be used economically to reduce fly ash carbon. Because fly ash has a much lower value than catalyst fines, acceptable economics would be much different. In addition, the expected allowable velocity would be on the order of 0.01 ft/sec, the single particle terminal settling velocity expected for the fine fly ash particles to prevent excess transport of material from the bubbling bed. A reactor using this velocity would have a huge plan area to pass the required air quantity and would be clearly uneconomic. It has now been discovered that bed velocity can be increased approximately two orders of magnitude without departing significantly from the bubbling bed regime, even for non-catalytic bubbling fluid beds using the fine fly ash particles as the bed of particles. Use of the high bed velocity allows reduction of bed plan area by a factor of approximately 100 with obvious economic benefits.

SUMMARY OF THE INVENTION

In one embodiment this invention is the method of reducing carbon content of fine particles of fly ash containing carbon, comprising (a) introducing the fly ash fine particles containing carbon to a dry bubbling fluid bed of the particles, and (b) oxidizing the carbon in the fly ash particles with air by intimately mixing the particles in the bed at a temperature of between about 1300° and about 1800° F. by introducing ambient air to the bed at a volume ratio of between about 1000 to about 1500, air to fly ash, and a velocity of between at least about 0.5, but less than about 3.0 feet per second, and particles having a residence time in the bed of at least about 2 minutes but up to about 100 minutes, (c) then removing the fly ash particles from the bed wherein the particles have had carbon content reduced by the oxidation so that the removed fly ash particles are enhanced pozzolan suitable for use, without further processing, to replace a portion of the cement in concrete. It is preferred that the oxidation use excess oxygen of between about 5 and about 15%. By "excess" is meant that oxygen greater than required for an equimolar oxidation of carbon. It is also necessary to remove excess heat from the bed and preferred to recover and use that heat. Preferred bed temperatures are between about 1400° and about 1700°, and even more preferred is between about 1500° and about 1600° F. The velocity of the air is preferred between about 1 and about 1.25 ft./sec. Preferred air to fly ash volume ratio is between about 1200 and about 1300, most preferred is 1250. The preferred residence time is between about 10 and 80 minutes and even more preferred is between about 30 and about 50 minutes. It is preferred that the particles of the fluidized bed, namely the fly ash, have an average particle size of about 100 microns or less.

Another embodiment of this invention is enhanced pozzolan produced from fly ash particles having carbon content reduced by the method described above. The beneficiated pozzolan is useful as a direct partial replacement for Portland cement in cementitious mixtures comprising fly ash conditioned in the bubbling fluid bed burnout process (oxidizing) described above. By direct is meant the beneficiated pozzolan is useful to replace a portion of cement in concrete without further processing. It is preferable that the enhanced pozzolan has less than 4% carbon and a size such that at least 66% thereof passes a 325 mesh screen by wet analysis.

The final embodiment of this invention is an apparatus for reducing carbon content of fly ash particles containing carbon, comprising in combination (a) means for introducing the carbon containing fly ash particles into (b) a dry bubbling fluid bed reactor, the fluid bed consisting essentially of the previously introduced fly ash particles, and the reactor having (c) means for introducing air into the reactor, (d) means for removing the particles from the reactor, (e) means for removing heat from the reactor, (f) means for removing the air and resulting combustion products from the reactor; and (g) the bubbling fluid bed reactor having a cross-sectional area transverse to the flow of the particles which is at least 10 times smaller than that area of a similar reactor designed based on a theoretical limiting factor of the terminal settling velocity of a single particle.

Three direct benefits result from carbon reduction by this invention. First, poor quality fly ash, becomes a marketable product. Second, heat energy representing about 0.5% of the total power plant fuel input can be recovered for use. Finally, the environment benefits directly by reduction in the quantity of fly ash routed to disposal sites and additionally by the immobilization of heavy metals in fly ash that occurs when the pozzolan becomes part of the concrete matrix.

DESCRIPTION OF THE PREFERRED EMBODIMENTS

Figure 1:
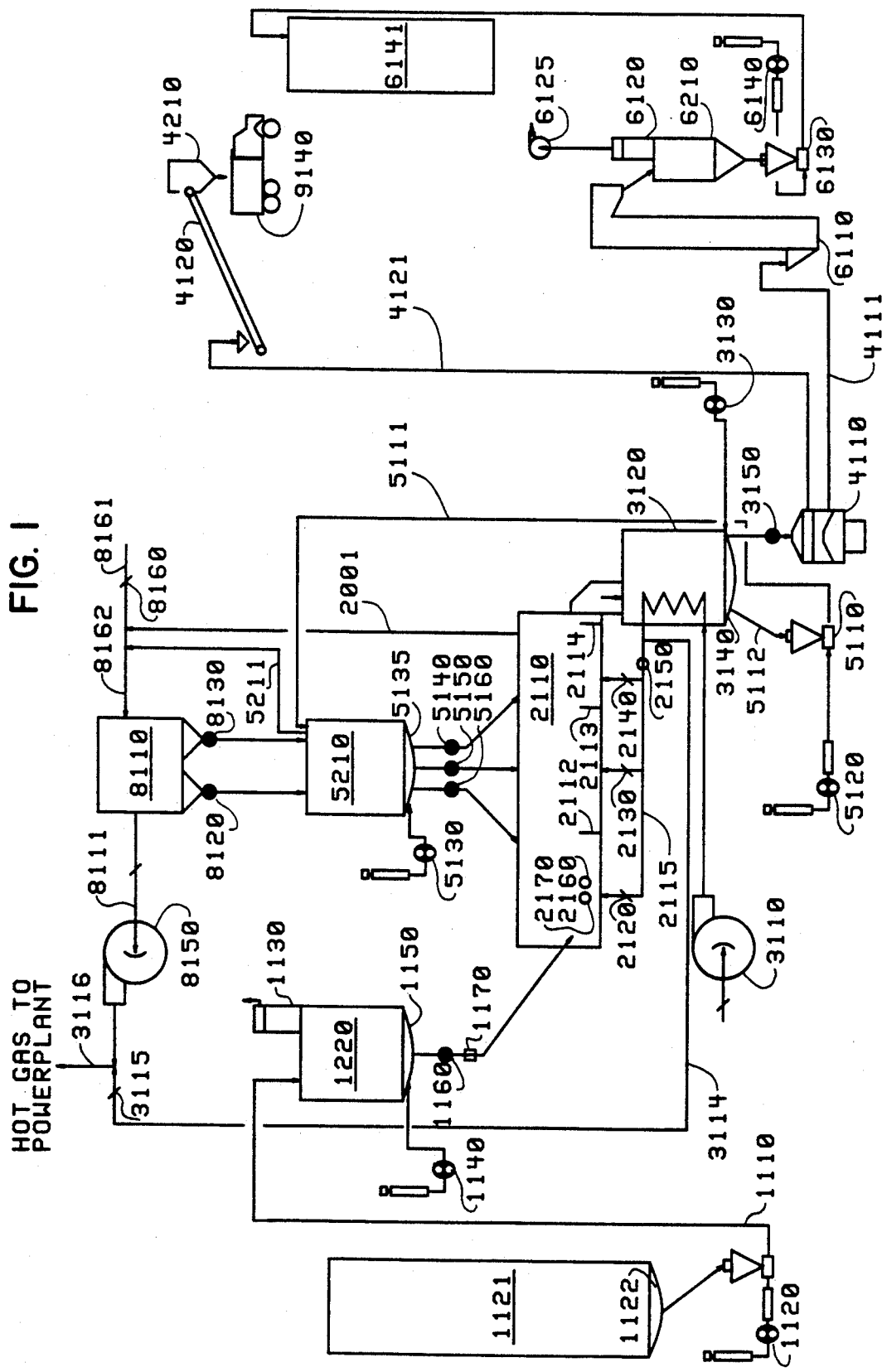
FIG. 1 is a schematic conceptual flow diagram of the fly ash carbon burnout plant preferred embodiment and best mode of this invention. Operating conditions for the best mode are the preferred conditions given in the Summary of the Invention.

The following is a general description of the advantages and an overview of the fly ash carbon burnout plant preferred design shown in FIG. 1. Numbers refer to the labeling symbols in FIG. 1.

Several design strategies have been incorporated to minimize plant capital cost, simplify operations, and reduce operating costs. Chief among these are:

No sustaining fuel use. External fuel is supplied to the start-up burners 2150, 2160 and 2170 only for cold and warm starts. Hot starts (unit shut for less than one day) and normal operation require no external fuel supply.

Recovery of heat in a hot gas stream 3116. This avoids the high cost of liquid heat transfer surface, pumps, valves, etc. (not only at the carbon burnout plant, but also at the heat receiving area in the power plant).

No in-bed heat transfer surface. Use of relatively cool recycle ash from recycle ash bin 5210 to control bed temperature eliminates the need for any expensive and erosion-prone heat transfer surface in the fluid bed in combustor 2110. Note, however, that specific conditions at some sites may warrant the extra cost of in-bed heat transfer surface and/or use of a liquid heat transfer medium.

To feed the process, feed fly ash from silo 1121 will be transported to a fly ash surge bin 1220 atop the fluid bed combustor (FBC) 2110. From this surge bin 1220 fly ash will be fed to the bubbling fluid bed in combustor 2110 at the required rate.

The fluid bed combustor 2110 will generally be divided into sections or stages (typically three). Fly ash will leave the combustor either as carryover (with the exhaust gas in line 2001) or by overflowing a weir 2114 at the end opposite the feed.

The hot fly ash which flows over the weir 2114 will fall into the air preheater 3120. The air preheater 3120 will be a high temperature indirect heat exchanger. The dual functions of the air preheater 3120 are to cool the fly ash for subsequent handling and recover the heat. The recovered heat will raise the temperature of air from the force draft fan 3110 to between 600° F. and 1000° F. Most of this air will become fluid bed combustion air. The remaining hot air, carrying its recovered heat, will be diverted to the power plant through lines 3114 and 3116.

A particle size classifier 4110 will remove foreign materials, sintered lumps, etc. from the cooled fly ash prior to transport of the product ash to silo 6141. Oversize material will be disposed of through line 4121.

The properly sized, low carbon fly ash will be transported to product ash silo 6141 for storage. This silo 6141 will be equipped for load out into pressure differential trucks.

A substantial quantity of the fluid bed material will leave the bed with the exhaust gas line 2001 as carryover. This material will be collected in the electrostatic precipitator (ESP) 8110 and fed by gravity into the recycle ash surge bin 5210. Atmospheric air from line 8161 will dilute the ESP 8110 feed stream and maintain the overall stream temperature at levels tolerable to the ESP 8110. The cleaned exhaust gas and dilution air mix will be drawn from the ESP 8110 and forwarded (with the recovered heat) through lines 8111 and 3116 to the power plant by the induced draft fan 8150.

The hot gas stream in line 3116 to the power plant will consist of excess hot forced draft air from line 3114 from the air preheater 3120 and the cleaned fluid bed exhaust gas/dilution air mixture from line 8111. This hot gas stream will be injected into the forced draft duct (not shown) downstream of the power plant air heater (not shown). The result of this will be a slight decrease in the power plant's forced draft air flow and a slight increase in the power plant's combustion air temperature. This will result in the use of less coal and an improvement in unit heat rate.

The ash deposited in the recycle ash surge bin 5210 by the dust collector ESP 8110 will have been cooled substantially by exposure to the dilution air admitted through damper 8160. This ash will be reinjected into the fluid bed combustor 2110 where it will act as a heat sink to control fluid bed temperature. For most operating conditions, the dust collector (ESP 8110) discharge stream will not be sufficient to fully control fluid bed temperature. Therefore, additional cool ash from the air preheater 3120 discharge will be transported to the recycle ash surge bin 5210 as needed through line 5111.

Individual feeders 5140, 5150 and 5160 will discharge recycle ash into each of the three fluid bed sections as required to maintain set point temperature in that section. The recycle ash surge bin 5210 will be atop the fluid bed combustor 2110 along side the feed ash surge bin 1220.

Functional Description

The following functional description describes the purpose and operation of each major equipment item or vessel in each system. Relationships between items (both physical and operational) are included. The equipment items described are shown graphically in FIG. 1.

Feed Ash System

Fly ash from the feed ash silo 1121 will be discharged through the silo's aerated bottom assembly 1122. An isolation valve (not shown) will be provided. The ash will flow into the feed ash transporter 1110. Transport air will be supplied by feed ash transport blower 1120. The blower 1120 will run continuously during carbon burnout plant operations. The control system will cycle the transporter 1110 as required to maintain set point level in the fly ash surge bin 1220.

The fly ash surge bin 1220 will be located above the fluid bed combustor 2110. Bolt on load cells (not shown) will provide the primary level indication for the fly ash surge bin 1220.

The fly ash surge bin aeration blower 1140 will provide air to the fly ash surge bin aerating discharger 1150 to maintain surge bin 1220 contents in a fluid state. Aeration air as well as transport air will be cleaned and released through a fly ash surge bin vent filter 1130.

The fluid bed fly ash rotary feeder 1160 will discharge ash from the fly ash surge bin 1220 through the feed ash impact scale 1170. Using feedback from the impact scale 1170, the control system will vary the fluid bed fly ash feeder 1160 speed to maintain fluid bed feed rate at set point.

Fluid Bed Combustion System

The basic component of the fluid bed combustor 2110 will be a refractory lined steel box. Its dimensions are chosen to provide the required residence time, gas velocity and bed depth.

Feed ash will flow by gravity from the feed ash impact scale 1170 into the feed end of the fluid bed combustor 2110. During processing, the ash will migrate down the length of the fluid bed combustor 2110 and exit at the opposite end. Weirs 2112, 2113 and 2114 at intermediate points in the bed will divide the fluid bed into three stages.

Optional bed maintenance recirculators (not shown) could recirculate bed material from the second FBC 2110 stage to the first and from the third to the second (respectively) during start-up to help even out the bed temperature. Compressed air would provide the motive force. Additionally, dump valves may be added to the bottom of the recirculators to remove agglomerates which will tend to collect there.

During normal operation, hot air from the air preheater 3120 will flow through the combustion air plenum 2115 and through three parallel combustion control dampers 2120, 2130, and 2140. Each of these dampers will discharge combustion air into a space beneath the bed plate (not shown) of each fluid bed combustor 2110 stage The air will flow into the fluid bed through an air distribution system (not shown) designed to prevent back flow of the fly ash upon loss or shutdown of fluidizing air.

Air flow to each stage will be measured by a mass flow meter (not shown). The control system will modulate the combustion control dampers 2120, 2130 and 2140 to keep each flow rate at its set point. The set point for each stage will be calculated to provide the desired fluidizing velocity and excess air.

Relatively cool ash from the three recycle ash rotary feeders 5140, 5150, and 5160 will be gravity fed into each of the three fluid bed combustor stages. The flow rate of each recycle ash feeder 5140, 5150 and 5160 will be varied by the control system to maintain the set point bed temperature in the affected stage.

Combustion exhaust gas and the carryover ash transported by it will leave the fluid bed combustor 2110 at the ash discharge end. This mixture of gas and ash will be ducted through lines 2001 and 8162 to the electrostatic precipitator 8110.

During cold or warm starts, No. 2 oil from a fuel tank (not shown) will be fired to bring the fluid bed combustor 2110 and its contents to auto-ignition temperature (approximately 1300° F.). FBC 2110 start-up duct burner 2150 and FBC 2110 startup burners A and B 2160 and 2170 will be used for this purpose. The duct burner 2150 will fire into the combustion air plenum while the other burners will fire into the FBC 2110 chamber just above bed level in the first stage.

After auto-ignition temperature is reached, the combustion reaction will be self-sustaining and use of No. 2 fuel oil will cease.

Air Preheating System

The forced draft fan 3110 will provide motive force to push ambient air into the heat recovery portion of the air preheater 3120. The air preheater 3120 will be a countercurrent, solid to gas, heat exchanger which will transfer heat from the hot product exiting the fluid bed combustor 2110 to the cooler forced draft stream. The resulting hot forced draft air will be divided into two streams. The primary stream will flow into the fluid bed combustor air plenum 2115 to provide oxygen for the carbon burnout reaction. The other stream will flow through line 3114 into the hot gas duct 3116 to the power plant. This stream will transport the recovered heat (which exceeds the quantity the combustion air could absorb) to the power plant for use.

The forced draft fan 3110 will be equipped with inlet dampers (not shown). The control system will modulate the inlet dampers to maintain the hot forced draft air temperature leaving the air preheater 3120 at its set point (between 600° F. and 1000°).

Hot forced air flow to the fluid bed combustor 2110 will be controlled by combustion control dampers A, B and C 2120, 2130 and 2140, respectively. Excess hot forced draft air will flow through the heat recovery air damper 3115 and through line 3116, which is the hot gas duct to the power plant. The control system will modulate this damper to maintain sufficient pressure for proper operation of the fluidized bed combustor 2110.

The air preheater 3120 will consist of a refractory lined steel box containing a number of stainless steel forced draft air ducts. Air from the forced draft fan 3110 will flow upwardly through these ducts while hot ash from the fluid bed combustor 2110 flows downwardly around the ducts. Fluidity of the fly ash product will be maintained by passing air from the air preheater aeration blower 3130 through the air preheater aerating discharger 3140.

The small quantity of aerating air and any ash entrained in it will be ducted through FBC 2110 exhaust gas line 2001 to the electrostatic precipitator (ESP) 8110 for cleaning and product recovery.

A suitably sized grizzly (not shown) near the top of the air preheater 3120 will prevent lumps large enough to plug the space between heat transfer ducts from entering that area. This feature is intended for protection against unusual upset conditions. If such conditions occur, the grizzly will require manual cleaning through a clean-out opening above.

Bolt on load cells (not shown) will provide the primary indication of ash level in the air preheater 3120. The control system will vary the speed of the air preheater 3120 product rotary feeder 3150 to maintain set point level in the air preheater 3120.

Particle Size Classifier System

Cooled fly ash product exiting the air preheater 3120 through the air preheater product rotary feeder 3150 will flow by gravity into the particle size classifier 4110. The particle size classifier 4110 will consist of a sealed, gyrating screen mechanism which will separate oversize from product at approximately 16 mesh. The oversize stream will consist primarily of oversize material which entered with the feed ash (power plant air heater basket pieces, boiler refractory pieces, agglomerates from the power plant electrostatic precipitator, etc.). In addition, any lumps formed due to sintering in the fluid bed combustor 2110 will be rejected as oversize.

Product from the particle size classifier 4110 will flow by gravity through line 4111 to the inlet of the product belt bucket elevator 6110. Oversize material will flow by gravity through line 4121 onto the oversize transfer belt conveyor 4120. This belt conveyor 4120 will transport the oversize material outside the plant building and elevate it sufficiently for dumping into the oversize discharge surge hopper 4210. The first several feet of the belt will be hooded. A dust pickup ducted from the belt hood to the product surge bin 6210 will collect any dust discharged with the oversize material from the particle size classifier 4110.

The oversize material will normally flow by gravity through the oversize discharge surge hopper 4210 into the plant dump truck 9140 stationed below. The surge hopper 4210 will be equipped with a clamshell discharge gate (not shown) and will accommodate a 1 cubic yard surge flow. This feature will be used during the short periods when the truck is transporting the oversize material to the disposal area.

Water sprays below the oversize discharge surge hopper 4210 will periodically wet the material in the dump truck to make sure it stays dust free.

Recycle Ash System

Cooled product ash from the air preheater 3120 will flow by gravity through line 5112 into the recycle ash transporter 5110. The transporter inlet valve (not shown) will open and shut to control flow to the transporter 5110 in accordance with the transporter's operating cycle. Ash from the transporter 5110 discharge will be lifted pneumatically to the recycle ash surge bin 5210. The recycle ash transport blower 5120 will provide the motive air to transport the recycle ash. The recycle transporter 5110 will be vented into the air preheater 3120 above the product ash level through a small pipe (not shown).

The recycle ash surge bin 5210 will consist of an insulated silo. Carryover ash will flow by gravity from the electrostatic precipitator discharge airlocks 8120 and 8130 into the recycle ash surge bin 5210. In addition, the surge bin 5210 will receive cooled product from the recycle ash transporter 5110 through line 5111, pneumatically.

Bolt on load cells (not shown) will provide a continuous indication of the recycle ash surge bin's 5210 weight. The control system will cycle the recycle ash transporter 5110 as required to maintain this weight at the set point value. The recycle ash transport blower 5120 will run continuously during plant operation.

The recycle ash aeration blower 5130 will provide air to the recycle ash aerating discharger 5135 to maintain ash in the recycle ash surge bin in a fluidized state. Both aeration air and pneumatic transport air will be vented from the recycle ash surge bin into the dust collector inlet line 8162 through line 5211.

Recycle ash dischargers A, B, and C 5140, 5150 and 5160, respectively will discharge recycle ash into the three fluid bed combustor 2110 stages. The control system will vary the speed of each of these dischargers as required to maintain set point temperature in the related fluid bed stage.

Product Handling System

Product from the particle size classifier 4110 will flow by gravity through line 4111 into the boot of the product belt bucket elevator 6111. The product belt bucket elevator 6110 will consist of a sealed, centrifugal elevator using standard belt to carry nylon buckets. The function of this elevator will be to lift the product ash being continuously discharged from the particle size classifier 4110 into the product surge bin 6210.

The product surge bin 6210 will continuously receive product ash from the product belt bucket elevator 6110 and discharge it batchwise into the product transporter 6130. The product surge bin 6210 will be quite small. The product surge bin 6210 vent filter 6120 and product surge bin vent filter fan 6125 will be mounted atop the product surge bin 6210. Through appropriate ducting (not shown), these items will maintain the casing of the product belt bucket elevator 6110, particle size classifier 4110, and oversize transfer belt conveyor 4120 at a slightly negative pressure. This will prevent dust emissions from these devices. In addition, the product transporter 6130 will vent into the product surge bin 6120 through a small pipe (not shown). Like the air from the other pick-up points, the vent air will be cleaned by the product surge bin vent filter 6120 prior to release.

Product ash will flow by gravity from the product surge bin 6210 into the product transporter 6130. The product surge bin 6210 will be designed for mass flow to ensure uninterrupted feed. The product transporter inlet valve (not shown) will control the flow in accordance with transporter design requirements. The control system will cycle the product transporter 6130 as needed to maintain the product surge bin 6210 level at set point.

The product transport blower 6140 will provide motive air to transport the product ash to the top of the product ash silo 6141. This blower 6140 will run continuously during plant operations.

Induced Draft System

Exhaust gas from the fluid bed combustor 2110 will be drawn into the electrostatic precipitator (ESP) 8110 by the induced draft fan 8150 through lines 2001 and 8162. Atmospheric air will be drawn through a modulating dilution air damper 8160 and duct 8161 into the electrostatic precipitator 8110 inlet duct line 8162 to moderate electrostatic precipitator 8110 inlet temperature. The combined exhaust gas and dilution air stream, after cleaning, will be forwarded through line 8111 by the I.D. fan 8150 to the "hot gas to power plant" duct 3116. This gas stream (at approximately 600° F.) will join the excess hot forced draft air stream from line 3114 (at between 600° F. and 1000° F.) in the duct. The combined hot gas stream (at between 600° F. and 700° F.) will transport the recovered heat to the power plant forced draft duct just upstream of the burner plenum.

Aeration air from the air preheater 3120 and recycle ash surge bin 5210 will be vented through lines 2001 and 5211 into the electrostatic precipitator 8110 inlet duct line 8162. Other minor vent streams may also be routed to this duct. The control system will modulate the dilution air damper 8160 to control the electrostatic precipitator 8110 inlet temperature at its set point (approximately 600° F.).

Dust collected by the electrostatic precipitator 8110 will discharge by gravity through the electrostatic precipitator discharge airlocks 8120 and 8130 into the recycle ash surge bin 5210.

The induced draft fan 8150 will be equipped with a modulating inlet damper (not shown). The control system will adjust this damper to maintain a slightly negative pressure (approximately −1 inWC) at the fluid bed combustor 2110 exhaust flange. The induced draft fan 8150 will be required to discharge against a fairly high static head (approximately 10 to 15 inWC) to push the cleaned gas stream to the power plant forced draft duct.

EXAMPLES

Figure 2:
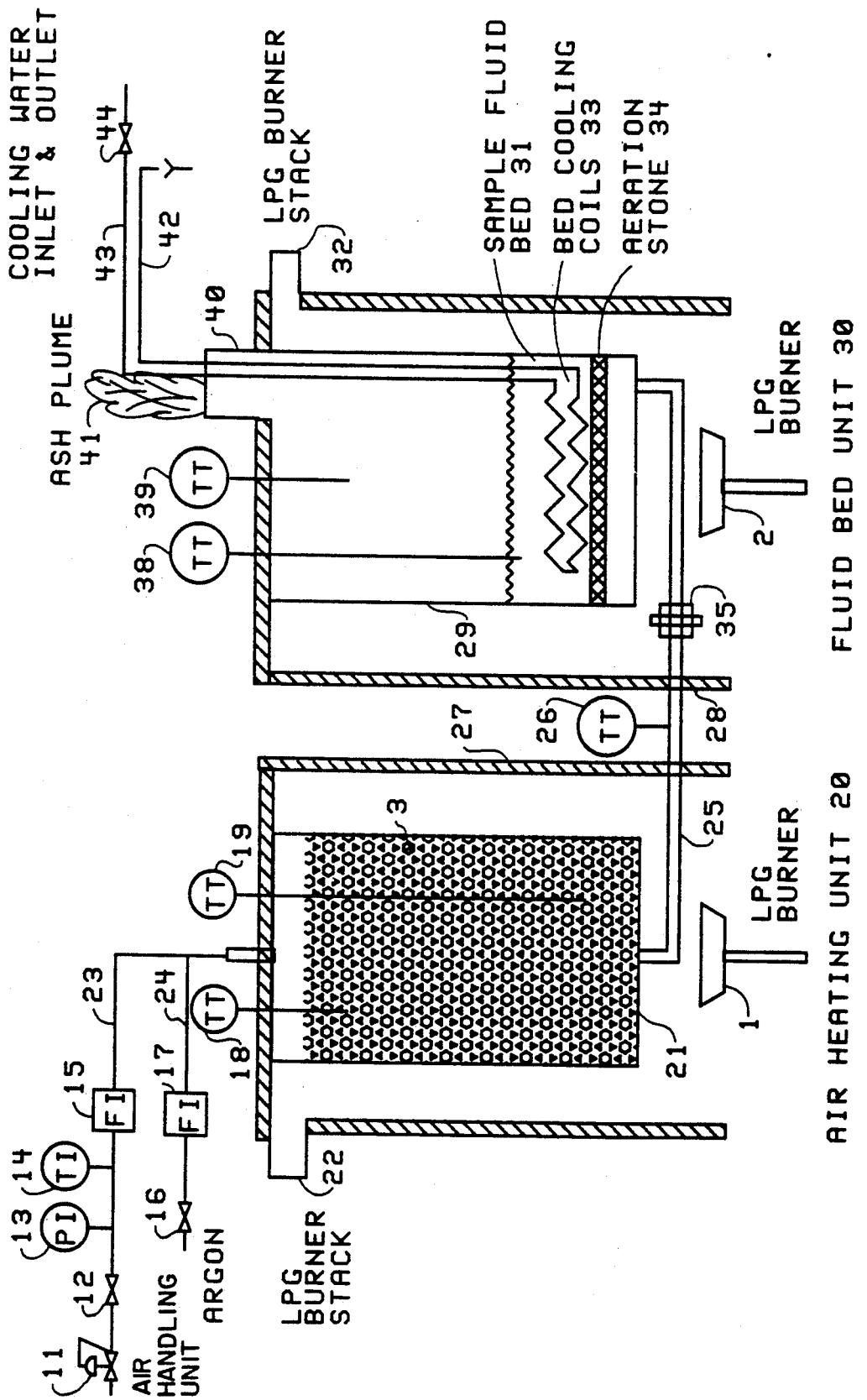
FIG. 2 is a schematic showing the fluid bed carbon burnout test module used for the testing described in the examples herein.

The examples of this invention were carried out on the Fluid Bed Burnout Test Module shown in FIG. 2. The test module in FIG. 2 is a simple batch device in which a fly ash sample 31 is heated to test temperature in an inert (low-oxygen) atmosphere and then fluidized with hot air which initiates the carbon burnout reaction. The test module consists primarily of air heating unit 20 and fluid bed unit 30 and their auxiliaries. The fluid bed unit 30 consists of fluid bed box 29 which contains the fly ash sample 31, aeration stone 34 (used for distribution of fluidizing air) and bed cooling coils 33 (used to control temperature rise during the burnout reaction). The fluid bed box 29 is, in turn, enclosed within an insulated steel box 28 which serves to contain the combustion gases from LPG burner 2 close to the fluid bed box 29 for heating the sample to test temperature. These gases are vented through LPG burner stack 32.

The air heating unit 20 is similar in construction. The inner box 21 holds a thermal storage mass 3 consisting of gravel which is used as a heat storage and heat transfer medium. The outer insulated box 27 contains the hot combustion gases from LPG burner 1 close to inner box 21. The gasses from LPG burner 1 are vented through LPG burner stack 22.

During a test, bed cooling coils 33 and sample fluid bed 31 are inserted into fluid bed box 29. A metal plate (not shown) is used to cover fluid bed exhaust 40. LPG burners 1 and 2 are fired to raise the temperature of the thermal storage mass 3 and sample fluid bed 31 respectively. Temperatures of the two units are monitored by thermocouples 18, 19, 38, and 39 as shown. When the bed temperature measured by thermocouple 38 reaches 1000° F., argon is admitted through valve 16 and measured by flow indicator 17 to line 24 which routes the gas through the thermal storage mass 3, pipe 25, union 35, and aeration stone 34 into the sample fluid bed 31. This prevents significant carbon burnout from occurring prior to introduction of fluidizing air (lab tests have shown that this reaction will not occur to any significant extent below 1000° F.). The argon flow is maintained at a value sufficient to maintain a low-oxygen content in fluid bed box 29 but insufficient to transport a measurable quantity of fly ash out of the fluid bed exhaust 40.

When the thermal storage mass 3 and sample fluid bed 31 have reached the desired temperatures, the metal plate (not shown) covering fluid bed exhaust 40 is removed, LPG burners 1 and 2 are cut back, argon valve 16 is closed, and air valve 12 is opened. Air from a compressor (not shown) is reduced to a pressure of approximately 2 PSI by regulator 11. The air flows through valve 12, flow indicator 15 and line 23 and through thermal storage mass 3. Pressure and temperature of the incoming air are monitored by pressure indicator 13 and temperature indicator 14. Heat is transferred from the hot thermal storage mass 3 to the incoming fluidizing air in inner box 21. The heated air flows through pipe 25 past thermocouple 26 and through union 35 into the fluid bed box 29. The hot air then passes through the aeration stone 34 into the sample fluid bed 31 where the carbon burnout reaction occurs. The combustion gases (containing a portion of the material from the sample fluid bed 31) exit the fluid bed exhaust 40 producing a visual ash plume 41. The incoming air flow rate measured by flow indicator 15 is adjusted by valve 12 to provide the desired superficial fluid bed velocity to fluidize the particles of fly ash in sample 31 fluid bed in fluid bed box 29. This flow is maintained until the desired quantity of air (depending upon the desired ratio of oxygen to carbon) has passed through the sample fluid bed 31. During the test, bed cooling coils 33 are used to maintain sample fluid bed 31 temperatures (as measured by thermocouples 38 and 39) in the desired range. Cooling water is admitted through valve 44 and pipe 43 to bed cooling coils 33. Heated cooling water is discharged through pipe 42.

After the proper quantity of air has passed through sample fluid bed 31, air valve 12 is closed, argon valve 16 is opened, LPG burners 1 and 2 are shut off, a steel plate (not shown) is used to cover fluid bed exhaust 40 and cooling water valve 44 is fully opened. After the test units have cooled sufficiently, bed cooling coils 33 are removed from fluid bed box 29. Union 35 is broken and the entire fluid bed box 2 is removed from the insulted steel box 28 for recovery of the remaining sample fluid bed 31 and inspection. Beginning and ending samples from the sample fluid bed 31, as well as any samples dipped from the bed during the test, are submitted to a laboratory for carbon content analysis.

EXAMPLES 1 TO 6 (RUNS 1 TO 6)

Using the fluid bed carbon burnout test module described above and in FIG. 2, runs 1 to 6 as summarized in Table I were carried out. The LOI test is ASTM C 311 for Loss On Ignition.

cate that the last of the carbon is harder to burn out than the rest.

2. Loss of material from the fluid bed was not excessive. Bed loss varied from 23.9% to 78.4% with the higher values being associated with longer air injection times. For the batch module, air injection time is equal to residence time. Therefore, the desirable long residence times and associated high carbon burn-outs will come at the cost of increased bed loss.

Loss of material from the bed was fairly constant for a given air flow. That is, the mass ratio of material lost to air flow did not change greatly from test to test.

TABLE I
FLUID BED CARBON BURNOUT TEST SUMMARY

| | \multicolumn{6}{c}{RUN NUMBERS} |
|---|---|---|---|---|---|---|
| | 1 | 2 | 3 | 4 | 5 | 6 |
| AIR FLOW | | | | | | |
| CORRECTED AIR FLOW (SCFM) | 6.2 | 5.7 | 5.7 | 5.7 | 5.6 | 5.7 |
| AIR FLOW DURATION (MIN) | 10.00 | 10.00 | 20.00 | 20.00 | 40.00 | 80.00 |
| TOTAL AIR MASS (LB) | 4.71 | 4.36 | 8.74 | 8.65 | 17.13 | 34.66 |
| AVG ASH BED TEMP (DEG F) | 1406.00 | 1886.00 | 1308.00 | 1478.00 | 1375.00 | 1407.00 |
| ACTUAL AIR FLOW (ACFM) | 22.14 | 25.75 | 19.44 | 21.10 | 19.78 | 20.36 |
| ACTUAL AIR VELOCITY (FT/SEC) | 1.11 | 1.29 | 0.97 | 1.06 | 0.99 | 1.02 |
| ASH CALCS | | | | | | |
| ASH FEED WEIGHT (LB) | 6.70 | 6.70 | 6.70 | 13.00 | 26.80 | 26.80 |
| RECOVERED PRODUCT (LB) | N/A | 5.10 | 3.80 | 9.40 | 12.20 | 5.80 |
| LOSS | | | | | | |
| (LB) | N/A | 1.60 | 2.90 | 3.60 | 14.60 | 21.00 |
| (%) | N/A | 23.88 | 43.28 | 27.69 | 54.48 | 78.36 |
| AIR LOSS TO AIR FLOW | | | | | | |
| (LB/MIN) | N/A | 0.16 | 0.15 | 0.18 | 0.37 | 0.26 |
| (%/MIN) | N/A | 2.39 | 2.16 | 1.38 | 1.36 | 0.98 |
| (LB/LB) | N/A | 0.37 | 0.33 | 0.42 | 0.85 | 0.61 |
| (LB/ACF) | N/A | 0.01 | 0.01 | 0.01 | 0.02 | 0.01 |
| CARBON CALCS | | | | | | |
| FEED CARBON (%) | 6.00 | 4.92 | 11.79 | 5.97 | 5.57 | 11.67 |
| PRODUCT CARBON (%) | 1.99 | 1.00 | 5.94 | 1.42 | 0.71 | 3.01 |
| CARBON BURNED | | | | | | |
| (LB) | 0.27 | 0.26 | 0.39 | 0.59 | 1.30 | 2.32 |
| (%) | 4.01 | 3.92 | 5.85 | 4.55 | 4.86 | 8.66 |
| REDUCTION (%) | 66.83 | 79.67 | 49.62 | 76.21 | 87.25 | 74.21 |
| OXYGEN CALCS | | | | | | |
| STOICHIOMETRIC 02 (LB) | 1.07 | 0.88 | 2.11 | 2.07 | 3.99 | 8.35 |
| ACTUAL 02 CONSUMED (LB) | 0.72 | 0.70 | 1.05 | 1.58 | 3.48 | 6.20 |
| OXYGEN IN AIR MASS (LB) | N/A | 1.01 | 2.03 | 2.01 | 3.97 | 8.04 |
| DESIRED EXCESS 02 % | N/A | 10.00 | 10.00 | 10.00 | 10.00 | 10.00 |
| ACTUAL EXCESS 02 % | N/A | 14.92 | −3.91 | −3.15 | −0.31 | −3.70 |

NOTE:
% CARBON ASSUMED EQUAL TO % LOI
FEED VALUES FROM COLD FEED SAMPLE
PRODUCT VALUES ARE MASS AVERAGES OF COLD PRODUCT FRACTIONS BASED ON MASS FRACTION ESTIMATES
LOST MATERIAL ASSUMED BURNED OUT TO SAME DEGREE AS RETAINED MATERIAL

RESULTS AND CONCLUSIONS

1. LOI reductions in the six runs (tests) ranged from 49.6% to 87.3%. In general, LOI reductions were better during the later tests when bed fluidization and lumping problems (see below) had been resolved.

Four of the six tests were performed with fly ash having an LOI of approximately 6%. The other two tests were performed using fly ash having an LOI of approximately 12%. Both of the higher content fly ash tests produced poorer reductions in LOI than the other tests.

During the early part of each test, the reduction in LOI was essentially linear with time. This indicates that the burnout rate was limited by the rate of oxygen introduction to the fluid bed. Toward the end of some tests, as the remaining carbon content became very low, the rate of burn-out dropped substantially. This may indi- Similarly, the ratio of mass of bed material lost to volume of air supplied did not vary greatly.

3. Fluidization within the bed was found to be strongly dependent on bed depth. Fluidization was very poor at a bed depth of 6 inches. It improved dramatically at 12 inches. Complete fluidization was reached at a 24 inch bed depth.

Bed depth is linked closely to residence time. For the one foot per second test design bed velocity, a 24 inch bed resulted in a 40 minute residence time for low carbon content fly ash and 80 minute residence time for high carbon content fly ash. Long residence times are good for carbon burn-out and do not affect unit throughput (unit throughput for the fluid bed carbon burn-out concept is determined exclusively by the bed area and bed velocity). However longer retention times will be associated with higher overall bed losses.

4. Bonding of the fly ash into sintered lumps was found to be a problem (particularly in early tests). After changes were implemented to assure full bed fluidization and to control bed temperature, these problems were dramatically reduced. The last few tests resulted in 1 to 10% of the recovered sample (½ to 5% of the total feed) being recovered as very softly sintered lumps. Nonetheless, product sizing and a "lump breaker" will be probably required in a commercial plant.

5. Bed cooling using water-cooled coils worked very well to control bed temperature. Without cooling, the burn-out of the carbon will raise the bed temperature excessively (peak temperature was greater than 2300° F. in run number 2). Cooling will be necessary for successful operation of a commercial plant. During the tests, the target bed temperature was 400° F. Optimizing the target temperature depends on desired results. Lower temperatures favor cheaper construction materials, lower $NO_x$, and (to a small degree) higher throughputs. Higher temperatures favor greater carbon burn-out and cheaper (smaller) heat transfer surfaces.

Note that the heat removed from the fluid bed may be recovered at a high temperature (on the order of 1000° F.) by use of suitable heat transfer surface. This should make the recovered heat valuable for reuse in the power plant or sale to an outside user.

6. Ignition was accomplished without preheating the reaction air. This seems to indicate that ignition is primarily dependent on bed temperature. Ignition seemed to occur easily any time bed temperature exceeded 1300° F.

Even though heated reaction air was not found necessary, it will probably be supplied in a commercial plant. This is because heating of the reaction air is a convenient way to recover some low temperature heat which would otherwise be lost.

While the invention has been described in connection with what is presently considered to be the most practical and preferred embodiments, the invention is not limited to the disclosed embodiment but, on the contrary, is intended to cover various modifications and equivalents included within the spirit and scope of the following claims.

What is claimed is:

1. The method of reducing carbon content of fine particles of fly ash containing carbon, comprising
   a) introducing said fly ash fine particles containing carbon to a dry bubbling fluid bed consisting essentially of said particles, and
   b) oxidizing said carbon in the fly ash particles by intimately mixing said particles with air in said bed at a temperature of between about 1300° and about 1800° F.,
   by introducing ambient air to said bed at a volume ratio of between about 1000 to about 1500, air to fly ash, at a velocity of between at least about 0.5, but less than about 3.0 ft./sec.,
   and said particles having a residence time in said bed of at least about 2 minutes, but up to about 100 minutes,
   c) then removing said fly ash particles from said bed, wherein said particles have had the carbon content reduced by said oxidation, so that said removed fly ash particles are enhanced pozzolan suitable for use, without further processing, to replace a portion of the cement in concrete.

2. The method of claim 1 wherein the oxidation is at an excess of between about 5 and about 15% oxygen.

3. The method of claim 1 wherein excess heat is recovered from said bed.

4. The method of claim 1 wherein said temperature is between about 1400° and about 1700° F.

5. The method of claim 1 wherein said temperature is between about 1500° and about 1600° F.

6. The method of claim 1 wherein said velocity is between about 1 and about 1.25 ft./sec.

7. The method of claim 1 wherein said air to fly ash volume ratio is between about 1200 to about 1300.

8. The method of claim 1 wherein said residence time is between about 10 and about 80 minutes.

9. The method of claim 1 wherein said residence time is between about 30 and about 50 minutes.

10. The method of claim 1 wherein said particles in the fluidized bed have an average particle size of about 100 microns or less.

* * * * *